US012050881B2

(12) United States Patent
Tu et al.

(10) Patent No.: US 12,050,881 B2
(45) Date of Patent: Jul. 30, 2024

(54) TEXT TRANSLATION METHOD AND APPARATUS, AND STORAGE MEDIUM

(71) Applicant: TENCENT TECHNOLOGY (SHENZHEN) COMPANY LIMITED, Shenzhen (CN)

(72) Inventors: Zhaopeng Tu, Shenzhen (CN); Xinwei Geng, Shenzhen (CN); Longyue Wang, Shenzhen (CN); Xing Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 672 days.

(21) Appl. No.: 17/183,913

(22) Filed: Feb. 24, 2021

(65) Prior Publication Data

US 2021/0182504 A1 Jun. 17, 2021

Related U.S. Application Data

(63) Continuation of application No. PCT/CN2019/120264, filed on Nov. 22, 2019.

(30) Foreign Application Priority Data

Nov. 28, 2018 (CN) .......................... 201811448899.8

(51) Int. Cl.
*G06F 40/58* (2020.01)
*G06F 40/10* (2020.01)
(Continued)

(52) U.S. Cl.
CPC .............. *G06F 40/58* (2020.01); *G06F 40/10* (2020.01); *G06F 40/44* (2020.01); *G06N 3/02* (2013.01)

(58) Field of Classification Search
CPC .......... G06F 40/58; G06F 40/10; G06F 40/44; G06N 3/02; G06N 3/044; G06N 3/045; G06N 3/048; G06N 3/08
See application file for complete search history.

(56) References Cited

U.S. PATENT DOCUMENTS 5,806,027 A * 9/1998 George ............... G10L 19/0018
704/E19.025
2009/0097556 A1* 4/2009 Nakagami ............ H04N 19/147
375/E7.243

(Continued)

FOREIGN PATENT DOCUMENTS

CN 107368476 A 11/2017
CN 107729329 A 2/2018

(Continued)

OTHER PUBLICATIONS

Serban, I., Sordoni, A., Lowe, R., Charlin, L., Pineau, J., Courville, A., & Bengio, Y. (Feb. 2017). A hierarchical latent variable encoder-decoder model for generating dialogues. In Proceedings of the AAAI conference on artificial intelligence (vol. 31, No. 1). (Year: 2017).*

(Continued)

*Primary Examiner* — Michelle M Koeth
*Assistant Examiner* — Philip H Lam
(74) *Attorney, Agent, or Firm* — ANOVA LAW GROUP, PLLC

(57) ABSTRACT

A text translation method includes: obtaining a to-be-translated text sequence; encoding the to-be-translated text sequence, to obtain a first hidden state sequence; obtaining a first state vector; generating a second hidden state sequence according to the first state vector and the first hidden state sequence; generating a context vector corresponding to a current word according to the second hidden state sequence and the first state vector; determining a (Continued)

second target word according to the context vector, the first state vector, and a first target word. The first state vector corresponds to a predecessor word of a current word, the current word is a to-be-translated word in the source language text, the predecessor word is a word that has been translated in the source language text. The first target word is a translation result of a predecessor word, and the second target word is a translation result of the current word.

16 Claims, 6 Drawing Sheets

(51) Int. Cl.
*G06F 40/44* (2020.01)
*G06N 3/02* (2006.01)

(56) References Cited

U.S. PATENT DOCUMENTS

| | | | | |
|---|---|---|---|---|
| 2014/0350914 | A1* | 11/2014 | Andrade Silva | G06F 40/44 704/2 |
| 2016/0092766 | A1* | 3/2016 | Sainath | G06N 3/048 706/20 |
| 2016/0179790 | A1 | 6/2016 | Watanabe et al. | |
| 2018/0144208 | A1* | 5/2018 | Lu | G06F 40/274 |
| 2018/0300317 | A1* | 10/2018 | Bradbury | G06F 40/44 |
| 2018/0300400 | A1* | 10/2018 | Paulus | G06N 3/044 |
| 2018/0329884 | A1* | 11/2018 | Xiong | G06N 3/044 |
| 2018/0349359 | A1* | 12/2018 | McCann | G06N 3/08 |
| 2019/0232488 | A1* | 8/2019 | Levine | G05B 19/042 |
| 2019/0278835 | A1* | 9/2019 | Cohan | G06F 40/289 |
| 2019/0332919 | A1* | 10/2019 | Weiss | G06N 3/045 |
| 2019/0377987 | A1* | 12/2019 | Price | G06N 3/045 |
| 2019/0384822 | A1 | 12/2019 | Tu et al. | |
| 2020/0042613 | A1* | 2/2020 | Jiang | G06N 3/08 |
| 2020/0226328 | A1 | 7/2020 | Tu et al. | |
| 2020/0387676 | A1* | 12/2020 | Kim | G06F 40/58 |

FOREIGN PATENT DOCUMENTS

| | | | | |
|---|---|---|---|---|
| CN | 108304388 | A | | 7/2018 |
| CN | 108776832 | A * | 11/2018 | ........... G06N 3/0454 |
| CN | 109543199 | A | | 3/2019 |

OTHER PUBLICATIONS

Bahdanau, D., Cho, K., & Bengio, Y. (2014). Neural machine translation by jointly learning to align and translate. arXiv preprint arXiv:1409.0473.). (Year: 2014).*
The World Intellectual Property Organization (WIPO) International Search Report for PCT/CN2019/120264 Feb. 1, 2020 6 Pages (including translation).
S. Hochreiter et al., "Long Short-Term Memory," 1997, Neural computation 9(8): 1735-1780. 46 pages.
K. Cho et al., "Learning Phrase Representations Using RNN Encoder-Decoder For Statistical Machine Translation," EMNLP 2014, pp. 1724-1734. 11 pages.
J. Gehring et al., "Convolutiona Sequence to Sequence Learning," ICML 2017. 10 pages.
Ashish Vaswani et al., "Attention Is All You Need". In Proceedings of Conference on Neural Information Processing Systems, NIPS 2017. 11 pages.
H Choi et al, "Context-Dependent Word Representation For Neural Machine Translation," Computer Speech & Language, Mar. 31, 2017. 12 pages.
N. R. Ke et al., "Focused Hierarchical RNNs for Conditional Sequence Processing," ICML 2018. 10 pages.
B. Zhang et al., "A GRU-Gated Attention Model for Neural Machine Translation," Arxiv:1704.08430, Apr. 27, 2017. 7 pages.

* cited by examiner

TEXT TRANSLATION METHOD AND APPARATUS, AND STORAGE MEDIUM

CROSS-REFERENCES TO RELATED APPLICATIONS

This application is a continuation application of PCT Patent Application No. PCT/CN2019/120264, filed on Nov. 22, 2019, which claims priority to Chinese Patent Application No. 201811448899.8, filed on Nov. 28, 2018 and entitled "TEXT TRANSLATION METHOD AND RELATED APPARATUS", the entire contents of both of which are incorporated herein by reference.

FIELD OF THE TECHNOLOGY

The present disclosure relates to the field of artificial intelligence, and in particular, to a text translation method and apparatus, and a storage medium.

BACKGROUND OF THE DISCLOSURE

In recent years, an encoder-decoder framework has achieved outstanding results in text processing tasks. The text processing tasks include machine-to-machine talk, machine question and answer, machine translation, and the like. In machine translation projects, different languages may be translated. For example, if an input sequence is an English sentence, a Chinese translation result of the English sentence may be outputted.

Currently, a specific translation process using the encoder-decoder framework as a translation model is: first, a source language sentence is converted into a vector representation, then a sequence of the vector representation is inputted into the encoder to obtain an intermediate vector after encoding, and finally, the decoder decodes the intermediate vector, to generate a translation result corresponding to a target language.

However, although the encoder-decoder framework can be used for translation, the translation quality is not high. Especially for long sentences, deviations in translation are more likely to occur, resulting in a relatively poor translation effect.

SUMMARY

Embodiments of the present disclosure provide a text translation method and apparatus, and a storage medium. A context vector obtained through decoding is introduced in the process of encoding a to-be-translated text sequence corresponding to a source language text, to enhance a representation of the to-be-translated text sequence and enhance an understanding of the source language text, thereby improving the translation quality. Especially for long sentences, the translation effect is better.

One aspect of the embodiments of the present disclosure provides a text translation method. The method includes: obtaining a to-be-translated text sequence, the to-be-translated text sequence being generated according to a source language text, and the source language text including at least one word; encoding the to-be-translated text sequence to obtain a first hidden state sequence; and obtaining a first state vector. The first state vector is a state vector corresponding to a predecessor word of a current word, the current word is a to-be-translated word in the source language text, and the predecessor word is a word that has been translated in the source language text. The method also includes: generating a second hidden state sequence according to the first state vector and the first hidden state sequence; generating a context vector corresponding to the current word according to the second hidden state sequence and the first state vector; and determining a second target word according to the context vector, the first state vector, and a first target word. The first target word is a translation result of the predecessor word, and the second target word is a translation result of the current word.

Another aspect of the embodiments of the present disclosure provides a text translation apparatus, including: a memory configured to store a program and a processor. The processor is configured to execute the program in the memory and perform a plurality of operations including: obtaining a to-be-translated text sequence, the to-be-translated text sequence being generated according to a source language text, and the source language text including at least one word; encoding the to-be-translated text sequence to obtain a first hidden state sequence; and obtaining a first state vector. The first state vector is a state vector corresponding to a predecessor word of a current word, the current word is a to-be-translated word in the source language text, and the predecessor word is a word that has been translated in the source language text. The processor is also configured to implement: generating a second hidden state sequence according to the first state vector and the first hidden state sequence; generating a context vector corresponding to the current word according to the second hidden state sequence and the first state vector; and determining a second target word according to the context vector, the first state vector, and a first target word. The first target word is a translation result of the predecessor word, and the second target word is a translation result of the current word.

Another aspect of the embodiments of the present disclosure provides a non-transitory computer-readable storage medium, storing instructions. The instructions, when run on a computer, cause the computer to perform a plurality of operations including: obtaining a to-be-translated text sequence, the to-be-translated text sequence being generated according to a source language text, and the source language text including at least one word; encoding the to-be-translated text sequence to obtain a first hidden state sequence; and obtaining a first state vector. The first state vector is a state vector corresponding to a predecessor word of a current word, the current word is a to-be-translated word in the source language text, and the predecessor word is a word that has been translated in the source language text. The instructions also cause the computer to perform: generating a second hidden state sequence according to the first state vector and the first hidden state sequence; generating a context vector corresponding to the current word according to the second hidden state sequence and the first state vector; and determining a second target word according to the context vector, the first state vector, and a first target word. The first target word is a translation result of the predecessor word, and the second target word is a translation result of the current word.

It can be learned from the foregoing technical solutions that the embodiments of the present disclosure have the following advantages:

In the embodiments of the present disclosure, a text translation method is provided. First, a to-be-translated text sequence is obtained, the to-be-translated text sequence being generated according to a source language text and including at least one vector (e.g., each vector corresponding to one word in the source language text); the to-be-translated text sequence is encoded, to obtain a first hidden state sequence; then, a second hidden state sequence is generated according to a first state vector and the first hidden state sequence, the first state vector being a state vector corresponding to a previous word or predecessor word; then, a context vector corresponding to a current word is generated according to the second hidden state sequence and the first state vector; and finally, a second target word is determined according to the context vector, the first state vector, and a first target word, the first target word being a translation result of the predecessor word, the second target word being a translation result of the current word. In the foregoing manner, a context vector obtained through decoding is introduced in the process of encoding a to-be-translated text sequence corresponding to a source language text, to enhance a representation of the to-be-translated text sequence and enhance an understanding of the source language text, thereby improving the translation quality. Especially for long sentences, the translation effect is better.

DESCRIPTION OF EMBODIMENTS

Embodiments of the present disclosure provide a text translation method and a related apparatus. A context vector obtained through decoding is introduced in the process of encoding a to-be-translated text sequence corresponding to a source language text, to enhance a representation of the to-be-translated text sequence and enhance an understanding of the source language text, thereby improving the translation quality. Especially for long sentences, the translation effect is better.

In the specification, claims, and accompanying drawings of the present disclosure, the terms "first", "second", "third", "fourth", and the like (if existing) are intended to distinguish between similar objects rather than describe a specific order or a chronological order. It is to be understood that data used in this way is interchangeable in a proper case, so that the embodiments of the present disclosure that are described herein can be implemented in a sequence other than those illustrated or described herein. In addition, the terms "include", "have" and any other variants thereof are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that the text translation method provided in the embodiments of the present disclosure may be applied to scenarios such as a question-answer system, a dialog system, natural language inference, and text summarization. To improve the translation quality, in the present disclosure, a context vector of a target end (that is, a target language) is integrated during encoding of a source language sentence, to improve a source language representation, so that the source language representation includes as much information related to the current context vector as possible, and content irrelevant to the current context vector of the target end is removed. In one embodiment, the context vector of the target end is first introduced into the source language representation, to implement a shallow re-understanding of the source language representation. Subsequently, a result of the shallow understanding is used as an input, and another encoder is introduced to re-encode the result of the shallow understanding, to obtain a deep understanding of the source end (that is, the source language) representation. In one embodiment, to reduce the time complexity of encoding and decoding, a selection policy is further introduced to dynamically determine whether a current source language representation needs to be re-encoded.

Figure 1:
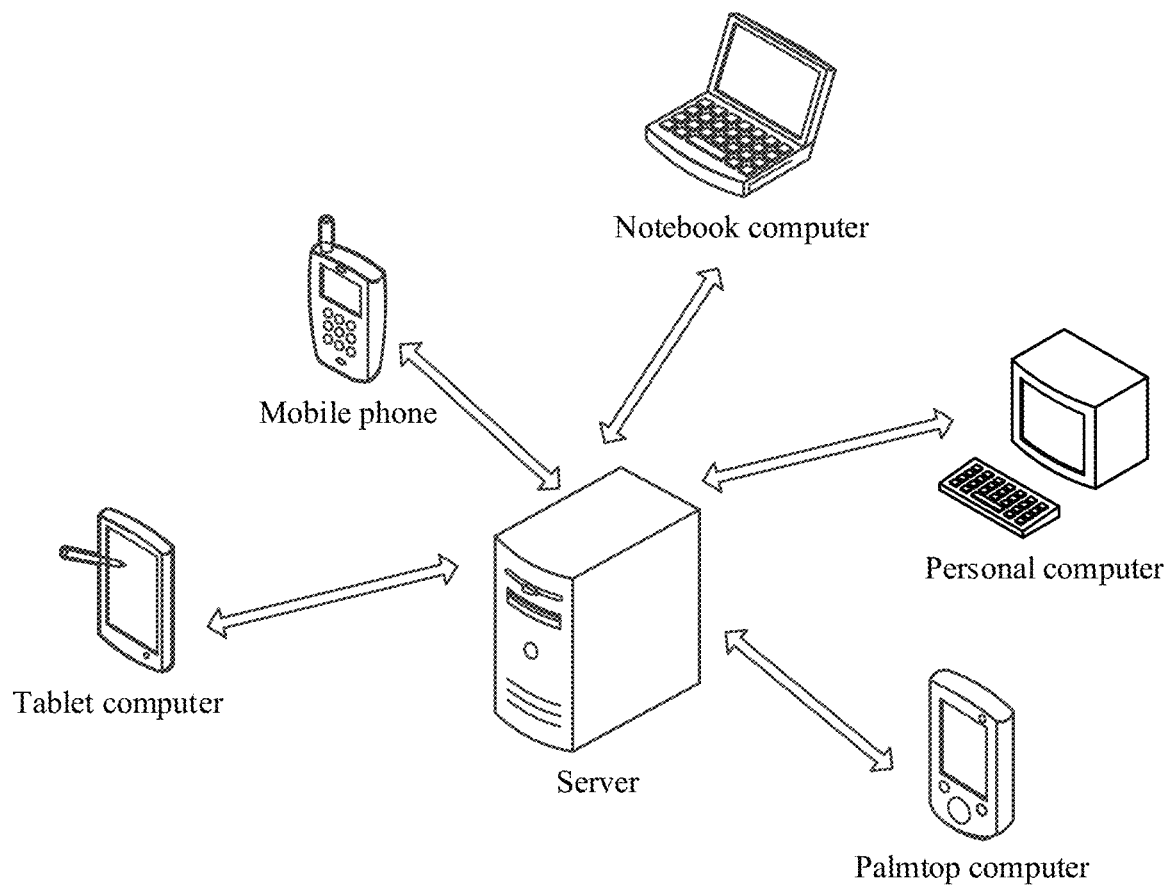
FIG. 1 is a schematic architectural diagram of a text translation system according to an embodiment of the present disclosure.

A text translation scenario is used as an example for description. FIG. 1 is a schematic architectural diagram of a text translation system according to an embodiment of the present disclosure. As shown in the figure, a text translation model provided in the present disclosure is deployed on a server. After a terminal device sends a source language text to the server, the server encodes, refines, and decodes the source language text, to generate a translation result. The server then sends the translation result to the terminal device, and the terminal device presents the translation result. In one embodiment, in an actual application, the text translation model may alternatively be directly deployed on the terminal device. That is, the terminal device may also translate the source language text by using the text translation model in an offline state, and generate a translation result. Finally, the translation result is also presented by the terminal device. It may be understood that the terminal device includes, but is not limited to, a tablet computer, a mobile phone, a notebook computer, a personal computer (PC), and a palmtop computer.

Figure 2:
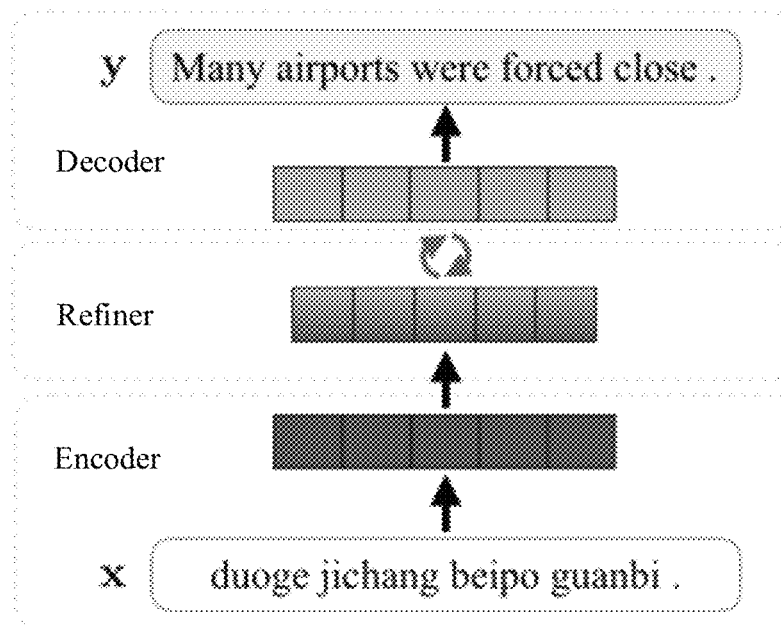
FIG. 2 is a schematic diagram of an encoder-refiner-decoder framework according to an embodiment of the present disclosure.

To introduce a context vector of a target end during encoding, the present disclosure provides an encoder-refiner-decoder framework (an encoder, a refiner, and a decoder constitute the text translation model), and a network structure thereof is shown in FIG. 2. For ease of understanding, FIG. 2 is a schematic diagram of an encoder-refiner-decoder framework according to an embodiment of the present disclosure. As shown in the figure, first, a standard encoder is used to encode a source language sentence x into a continuous sequence. Then, during decoding, a context vector of a target end is introduced to refine the source-end continuous sequence, so that content included in a text sequence is more relevant to current decoded content. Finally, a complete target-end text sequence is obtained through decoding, to obtain a translation result y.

In the encoder-refiner-decoder framework, the refiner is a newly added network layer, and is also a core module provided in the present disclosure. A main function of the refiner is to consider a context vector of a target end, to re-understand an input sequence representation, refine information relatively important to the current decoder, and remove irrelevant content. To achieve the objective, the refiner in the present disclosure includes the following important functions: 1. A current state of the decoder is used as a context vector, and the context vector and a source-end continuous sequence are used as an input, to implement a shallow understanding. 2. The shallow understanding is used as an input, and a deep understanding of the shallow understanding is implemented through re-encoding. 3. To reduce the time complexity of the model, reinforcement learning is performed for a conditional comprehension policy to determine whether it is necessary to refine a source-end representation.

Figure 3:
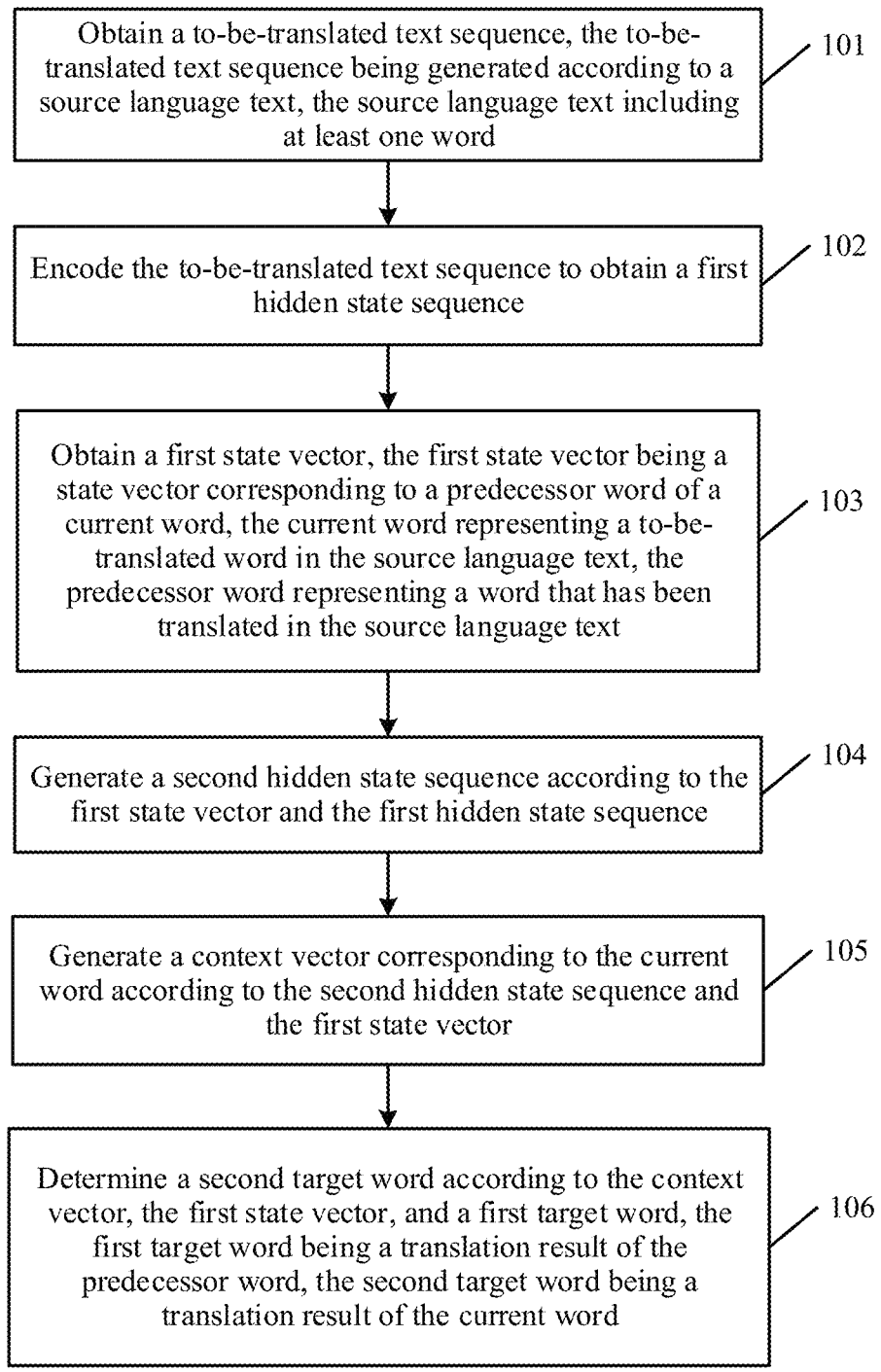
FIG. 3 is a schematic diagram of an embodiment of a text translation method according to an embodiment of the present disclosure.

The text translation method in the embodiments of the present disclosure is described below. Referring to FIG. 3, a text translation method provided in an exemplary embodiment of the present disclosure includes the following steps:

101: Obtain a to-be-translated text sequence, the to-be-translated text sequence being generated according to a source language text, the source language text including at least one word.

In this embodiment, first, an encoder of a text translation apparatus obtains the source language text. A source language may be languages of different countries such as Chinese, English, French, Japanese, and German. The source language text includes at least one word, and usually includes a plurality of words. Schematically, when the source language is English, the source language text may be represented as "I have a pen", and then the source language text includes 4 words.

A target language obtained through translation corresponds to the source language, and the target language may also be languages of different countries such as Chinese, English, French, Japanese, and German. After the encoder obtains the source language text, word embedding needs to be performed on the source language text. That is, the encoder represents each word with an N-dimensional vector through word embedding. Similar words correspond to similar word embeddings, and are close to each other in an N-dimensional embedding space. The word embedding is obtained based on a model trained for a language task. It is assumed that a 300-dimensional word embedding is used. After an input sentence is represented as a word embedding sequence, the word embedding sequence may be transmitted to a recurrent layer of the encoder.

The source language text may be represented as $x=x_1, \ldots, x_j, \ldots x_J$. Correspondingly, a target language text may be represented as $y=y_1, \ldots, y_i, \ldots y_I$.

102: Encode the to-be-translated text sequence to obtain a first hidden state sequence.

In this embodiment, after obtaining the to-be-translated text sequence, the encoder starts to encode the to-be-translated text sequence, to obtain the first hidden state sequence. The to-be-translated text sequence may be encoded by using a recurrent neural network (RNN), to obtain the first hidden state sequence. The RNN is a network model that converts sequence modeling into time series modeling. The RNN cyclically transmits a state in a network of the RNN.

In each step of sequence processing, a hidden state of the RNN is transmitted to a next item of a receiving sequence for a next iteration of the RNN, and an encoded vector is outputted for each sample in a batch during the iteration. Each step of the sequence processing outputs a "matrix", and the "matrix" is connected to a matrix outputted during backward sequence processing by the RNN.

It may be understood that, in an actual application, other types of neural networks may alternatively be used for encoding, for example, a long short-term memory (LSTM) network, a gated recurrent unit (GRU), a convolutional neural network (CNN), or a self-attention network (SAN). The RNN is merely an example used herein, and is not to be construed as a limitation on the present disclosure.

103: Obtain a first state vector, the first state vector being a state vector corresponding to a previous word or predecessor word of a current word, the current word representing a to-be-translated word in the source language text, the predecessor word representing a word that has been translated in the source language text.

In this embodiment, the text translation apparatus obtains the first state vector, the first state vector being the state vector corresponding to the previous word or predecessor word. If the source language text is "many airports were forced close" and the word being translated currently is "airports", the current word is "airports". The predecessor word of "airports" that has been translated is "many", and therefore, "many" is the predecessor word of the current word.

104: Generate a second hidden state sequence according to the first state vector and the first hidden state sequence.

In this embodiment, a refiner of the text translation apparatus refines the first hidden state sequence by using the state vector corresponding to the predecessor word and the first hidden state sequence, to obtain the second hidden state sequence. In one embodiment, the state vector (that is, the first state vector) of the predecessor word "many" and the first hidden state sequence may be used as an input of the refiner, which is equivalent to refining the first hidden state sequence to generate the second hidden state sequence.

105: Generate a context vector corresponding to the current word according to the second hidden state sequence and the first state vector.

In one embodiment, after the refiner of the text translation apparatus obtains the second hidden state sequence, an attention model is used. The second hidden state sequence and the first state vector are inputted into the attention model, and the corresponding context vector is outputted. Correspondingly, an input of a decoder is the context vector outputted by the refiner, and a predicted word (that is, a first target word) in the previous step of the recurrent unit.

106: Determine a second target word according to the context vector, the first state vector, and the first target word, the first target word being a translation result of the predecessor word, the second target word being a translation result of the current word.

In this embodiment, the decoder of the text translation apparatus obtains the second target word through decoding according to the context vector, the first state vector, and the first target word. The first target word is the translation result of the predecessor word, and the second target word is the translation result of the current word. It is assumed that the source language text is "many airports were forced close", and the source language text is translated into Chinese "许多机场被迫关闭". It is assumed that the word "airports" needs to be translated currently, then "机场" is the second target word. The first target word is "许多".

In this embodiment of the present disclosure, a text translation method is provided. First, a to-be-translated text sequence is obtained, the to-be-translated text sequence being generated according to a source language text; the to-be-translated text sequence is encoded, to obtain a first hidden state sequence; then, a second hidden state sequence is generated according to a first state vector and the first hidden state sequence, the first state vector being a state vector corresponding to a predecessor word; then, a context vector corresponding to a current word is generated according to the second hidden state sequence and the first state vector; and finally, a second target word is determined according to the context vector, the first state vector, and a first target word, the first target word being a translation result of the predecessor word, the second target word being a translation result of the current word. In the foregoing manner, a context vector obtained through decoding is introduced in the process of encoding a to-be-translated text sequence corresponding to a source language text, to enhance a representation of the to-be-translated text sequence and enhance an understanding of the source language text, thereby improving the translation quality. Especially for long sentences, the translation effect is better.

Based on the embodiments corresponding to FIG. 3, in a first embodiment of the text translation method provided in the embodiments of the present disclosure, the generating a second hidden state sequence according to the first state vector and the first hidden state sequence may include:

calculating a gating function according to a target hidden state vector and the first state vector, the target hidden state vector being a hidden state vector in the first hidden state sequence;

calculating a target shallow understanding vector according to the gating function and the target hidden state vector;

generating a shallow understanding sequence according to the target shallow understanding vector, the shallow understanding sequence being in correspondence with the first hidden state sequence; and encoding the shallow understanding sequence to obtain the second hidden state sequence.

Figure 4:
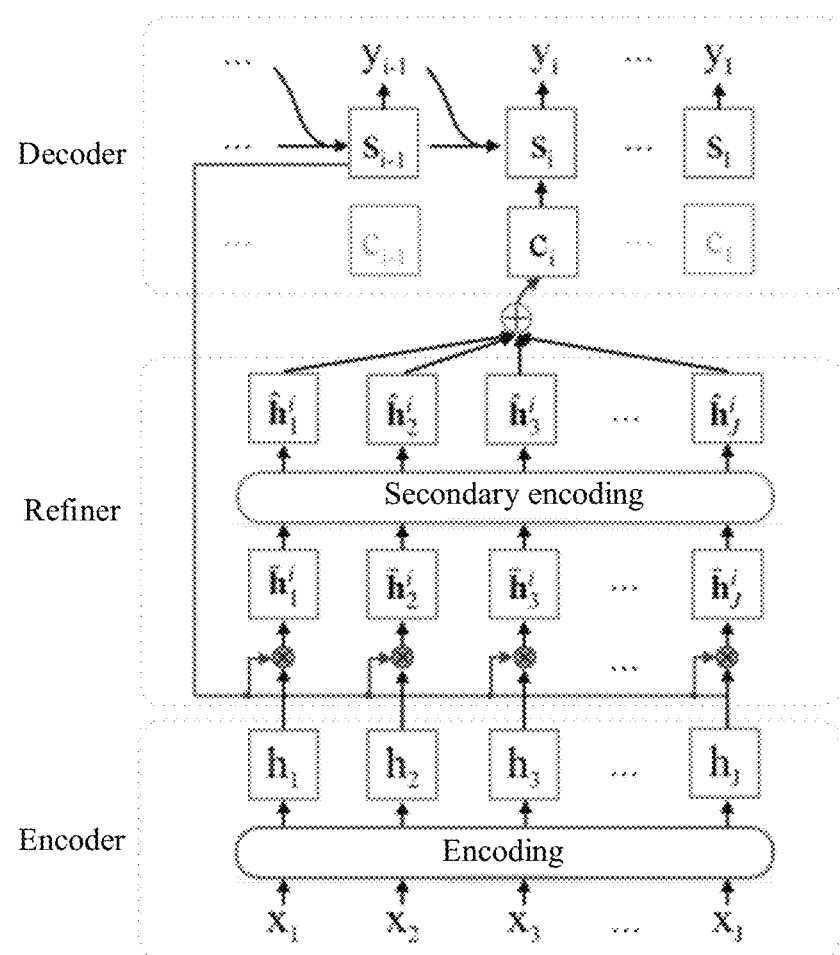
FIG. 4 is a schematic diagram of an encoder-refiner-decoder network structure according to an embodiment of the present disclosure.

In this embodiment, how the text translation apparatus generates the second hidden state sequence is described. For ease of description, FIG. 4 is a schematic diagram of an encoder-refiner-decoder network structure according to an embodiment of the present disclosure. As shown in the figure, in each step of decoding by the decoder, a decoder state $s_{i-1}$ in the previous step and a source-end first hidden state sequence h are used as an input, to finally obtain a refined sequence $h^i$.

In a possible implementation, a gating function $z^i_j$ is calculated according to a target hidden state vector $h_j$ (belonging to the first hidden state sequence h) and a first state vector $s_{i-1}$. Then, a target shallow understanding vector $\bar{h}^i_j$ is obtained through calculation according to the gating function $z^i_j$ and the target hidden state vector $h_j$. Through a series of calculation, each shallow understanding vector is obtained, to generate a shallow understanding sequence $\bar{h}^i$ (including $\bar{h}^i_1, \bar{h}^i_2, \bar{h}^i_3, \ldots, \bar{h}^i_j$). The shallow understanding sequence is in correspondence with the first hidden state sequence. That is, $h_1$ in the first hidden state sequence corresponds to $\bar{h}^i_1$ in the shallow understanding sequence, and $h_2$ in the first hidden state sequence corresponds to $\bar{h}^i_2$ in the shallow understanding sequence, and the rest may be deduced by analogy. Finally, the refiner encodes the shallow understanding sequence to obtain a second hidden state sequence $\hat{h}^i$ (including $\hat{h}^i_1, \hat{h}^i_2, \hat{h}^i_3, \ldots, \hat{h}^i_j$).

In addition, in this embodiment of the present disclosure, a manner of generating the second hidden state sequence according to the first state vector and the first hidden state sequence is described. First, the gating function is calculated according to the target hidden state vector and the first state vector; then, the target shallow understanding vector is calculated according to the gating function and the target hidden state vector; then, the shallow understanding sequence is generated according to the target shallow understanding vector, the shallow understanding sequence being in correspondence with the first hidden state sequence; and finally, the shallow understanding sequence is encoded, to obtain the second hidden state sequence. In the foregoing manner, a gating function is introduced to control information transmission in source-end encoding, to implement a dynamic representation of the source-end information, thereby improving the recognition capability of the model.

Based on the first embodiment corresponding to FIG. 3, in a second optional embodiment of the text translation method provided in the embodiments of the present disclosure, the calculating a gating function according to a target hidden state vector and the first state vector may include:

calculating the gating function according to the target hidden state vector, the first state vector, and a sigmoid function.

In a possible implementation, the gating function may be calculated in the following manner:

$$z^i_j = \sigma(W_z h_j + U_z s_{i-1} + b_z),$$

where $z^i_j$ represents the gating function, $\sigma(\cdot)$ represents the sigmoid function, $W_z$ represents a first network parameter, $U_z$ represents a second network parameter, $b_z$ represents a third network parameter, $h_j$ represents the target hidden state vector, and $s_{i-1}$ represents the first state vector. It may be understood that the gating function may be used for controlling a degree of information flow. As a non-linear function, the sigmoid function has a value range of 0 to 1. Certainly, in another possible implementation, the gating function may alternatively be calculated by using another non-linear function. This is not limited in this embodiment.

The calculating a target shallow understanding vector according to the gating function and the target hidden state vector may include:

performing element-wise multiplication on the target hidden state vector and the gating function to obtain the target shallow understanding vector.

In a possible implementation, the target shallow understanding vector may be calculated in the following manner:

$$\bar{h}^i_j = z^i_j \square h_j,$$

where $\bar{h}^i_j$ represents a target shallow understanding vector, and $\square$ represents element-wise multiplication.

In this embodiment, a manner of calculating the gating function and the target shallow understanding vector is described. First, the refiner of the text translation apparatus calculates the gating function by using the sigmoid function; and then, the target shallow understanding vector is calculated according to the gating function and the target hidden state vector. A manner of element-wise multiplication is used herein to calculate the target shallow understanding vector. It is assumed that a group of data is [a1, a2, a3], and another group of data is [b1, b2, b3], then element-wise multiplication is to obtain a group of data [a1b1, a2b2, a3b3], that is, obtain a result by multiplying vectors.

Moreover, in this embodiment of the present disclosure, a specific manner of calculating the gating function and the target shallow understanding vector is provided. In the foregoing manner, on one hand, a specific implementation basis is provided for calculating the target shallow understanding vector, thereby improving the feasibility of the solution; on the other hand, in an actual application, the target shallow understanding vector can be more accurately generated, thereby improving the practicality of the solution.

Based on the first embodiment corresponding to FIG. 3, in a third optional embodiment of the text translation method provided in the embodiments of the present disclosure, the encoding the shallow understanding sequence to obtain the second hidden state sequence may include:

calculating the second hidden state sequence in the following manner:

$$\hat{h}^i = \text{encoder}_{re}(\overline{h}_1^i, \ldots, \overline{h}_j^i, \ldots, \overline{h}_{J'}^i),$$

where $\hat{h}^i$ represents the second hidden state sequence, $\text{encoder}_{re}(\bullet)$ represents second-time encoding, $\overline{h}_1^i$ represents a first shallow understanding vector, $\overline{h}_j^i$ represents the target shallow understanding vector, and $\overline{h}_{J'}^i$ represents a $J^{th}$ shallow understanding vector.

In this embodiment, after the text translation apparatus completes the shallow understanding, that is, obtains the shallow understanding sequence, an encoder may further be additionally introduced to perform deep understanding on the shallow understanding sequence. An inputted shallow understanding sequence $\overline{h}_1^i, \ldots, \overline{h}_j^i, \ldots, \overline{h}_{J'}^i$ is re-encoded by using another encoder $\text{encoder}_{re}$, to obtain a deep understanding representation, that is, the second hidden state sequence $\hat{h}^i$.

$\text{encoder}_{re}$ and encoder (the encoder used for encoding the to-be-translated text sequence) use different parameter sets.

Moreover, in this embodiment of the present disclosure, the text translation apparatus further needs to encode the shallow understanding sequence to obtain the second hidden state sequence. In the foregoing manner, the deep understanding of the shallow understanding sequence is implemented. In addition, an additional encoder is introduced to re-encode the shallow understanding sequence, thereby improving the operability and feasibility of the solution.

Based on FIG. 3 and any one of the first to the third embodiments corresponding to FIG. 3, in a fourth optional embodiment of the text translation method provided in the embodiments of the present disclosure, after the determining a second target word according to the context vector, the first state vector, and a first target word, the method may further include:

calculating a target output probability according to the context vector, a second state vector, and a word vector corresponding to the second target word, the second state vector being a state vector corresponding to the current word;

calculating a continuous sampled vector according to the target output probability, the continuous sampled vector being used for generating a continuous sampled sequence;

calculating a discrete sampled vector according to the continuous sampled vector, the discrete sampled vector being used for generating a discrete sampled sequence;

calculating an encoding result according to the discrete sampled vector; and determining a processing mode according to the encoding result, the processing mode including a first processing mode and a second processing mode, the first processing mode indicating that an existing encoding result is used, the second processing mode including encoding the first hidden state sequence.

In this embodiment, a conditional refinement selection policy is provided. If the provided encoder-refiner-decoder framework re-understands a representation of the source language text in each step of decoding, the time complexity is very high. Actually, not each step of decoding requires re-refinement and a re-understanding of source language text encoding. For example, in the same complete semantic unit (for example, phrase), semantic meanings thereof are relatively similar. Therefore, the semantic unit only needs to be refined once at the beginning, and then the refinement result is used during the entire semantic unit translation process. Therefore, to reduce the time complexity of the model, a conditional mechanism is provided to control whether source-end encoding needs to be re-refined in a current step.

In a possible implementation, the text translation apparatus may predict whether a next/successor word needs to be refined. First, the target output probability is calculated according to the context vector, the second state vector, and the word vector corresponding to the second target word. Then, the continuous sampled vector is calculated according to the target output probability, the continuous sampled vector being used for generating the continuous sampled sequence. The text translation apparatus then calculates the discrete sampled vector according to the continuous sampled vector, the discrete sampled vector being used for generating the discrete sampled sequence. Finally, the text translation apparatus calculates the encoding result according to the discrete sampled vector, and determines the processing mode according to the encoding result, the processing mode including the first processing mode and the second processing mode, the first processing mode indicating that the existing encoding result is used, the second processing mode indicating that the first hidden state sequence is encoded.

In the foregoing manner, it is unnecessary to refine each word, thereby reducing the complexity of the model. By providing a conditional refining policy, whether a current representation needs to be refined may be dynamically determined, thereby improving the flexibility and practicality of the solution.

Based on the fourth embodiment corresponding to FIG. 3, in a fifth optional embodiment of the text translation method provided in the embodiments of the present disclosure, the calculating a target output probability according to the context vector, a second state vector, and a word vector corresponding to the second target word may include:

determining a state of a policy function by using a hyperbolic tangent function according to the context vector, the second state vector, and the word vector corresponding to the second target word; and calculating the target output probability by using a normalized exponential function according to the state of the policy function.

In a possible implementation, the target output probability may be calculated in the following manner:

$$\pi(a_i|m_i) = \text{softmax}(W_p m_i + b_p)$$

$$m_i = \tanh(W_p'[s_i; E_{yi}; c_i] + b_p'),$$

where $\pi(a_i|m_i)$ represents the target output probability, $a_i$ represents an output action, $m_i$ represents the state of the policy function, $W_p$ represents a fourth network parameter, $b_p$ represents a fifth network parameter, $W_p'$ represents a sixth network parameter, $b_p'$ represents a seventh network parameter, $S_i$ represents the second state vector, $E_{yi}$ represents the word vector corresponding to the second target word, $c_i$ represents the context vector, softmax($\bullet$) represents the normalized exponential function, and tanh($\bullet$) represents the hyperbolic tangent function.

In this embodiment, after the conditional refinement selection policy is introduced, two output actions may be set, where one output action is re-refining the source language text encoding, that is, generating $\hat{h}_{i+1}$, and the other output action is selecting to use a previous refinement result, that is, obtaining $\hat{h}_i$.

Because the output action $a_i$ predicts whether refinement is required for a next moment (a next word), the second state vector $S_i$ of a current moment (a current word), the word vector $E_{yi}$ corresponding to the second target word, and the context vector $c_i$ are used. The policy function $m_i$ outputs continuous probability values, and the output action represents discrete values indicating whether refinement needs to be performed. A sampling function may be used to implement the discrete output action from the continuous probability values. The sampling function performs sampling according to the probability, and a larger probability value indicates a larger quantity of actions corresponding to the sampling.

Further, in this embodiment of the present disclosure, a manner in which the text translation apparatus calculates the target output probability according to the context vector, the second state vector, and the word vector corresponding to the second target word is described. In the foregoing manner, on one hand, an implementation basis is provided for calculating the target output probability, thereby improving the feasibility of the solution. On the other hand, in an actual application, a possibility of refinement can be more accurately represented, thereby improving the operability of the solution.

Based on the fifth embodiment corresponding to FIG. 3, in a sixth optional embodiment of the text translation method provided in the embodiments of the present disclosure, the calculating a continuous sampled vector according to the target output probability may include:

sampling the target output probability by using a preset sampling function to obtain a sampled parameter, the preset sampling function being a Gumbel-SoftMax function, the sampled parameter being discrete; and performing continuation processing on the sampled parameter to obtain the continuous sampled vector. In a possible implementation, the continuous sampled vector may be calculated in the following manner:

$$\bar{a}_i^k = \frac{\exp((o_i^k + g_i^k)/\tau)}{\sum_{k'=1}^{K} \exp((o_i^{k'} + g_i^{k'})/\tau)},$$

$$g_i^k = -\log(-\log u_i^k),$$

$$u_i^k \square \text{Uniform}(0, 1),$$

where $\bar{a}_i^k$ represents the continuous sampled vector, exp (•) represents an exponential function with a natural constant e as the base, $o_i^k$ represents a first probability that is not normalized, $g_i^k$ represents a first noise, $o_i^{k'}$ represents a second probability that is not normalized, $g_i^{k'}$ represents a second noise, $\tau$ represents a first hyperparameter, $u_i^k$ represents the sampled parameter, $\square$ represents a sampling operation, Uniform (0,1) represents uniform distribution within a range of 0 to 1, and K represents a total dimension of an output action.

In this embodiment, the policy function needs to be sampled during training to generate a corresponding action sequence. To optimize the network, a Gumbel-SoftMax function may be used to perform continuation processing on the discrete $\bar{a}_i^k = \bar{a}_i^1, \ldots, \bar{a}_i^K$. The Gumbel-SoftMax function may be considered as a sampling function. Sampling may be performed on the target output probability $\pi(a_i|m_i)$ by using the sampling function, to obtain the output action $a_i$. Sampling is performed by using the discrete variable $a_i$ to obtain a distribution vector $\bar{a}_i^k$ with a continuous representation. Continuation representation is performed on discrete values because the model needs to calculate a gradient, and only continuous values have a gradient. Through an approximate sampling process of the Gumbel-SoftMax function, a final result is continuous and derivable.

It may be understood that the sampling function is similar to a coin toss. The result of a coin toss is a front side or a back side, which represents an output of the sampling function. If the probability of occurrence of the front side is 0.7, the probability of occurrence of the back side is 0.3. A higher probability indicates a higher possibility of occurrence of a corresponding result.

Further, in this embodiment of the present disclosure, a specific manner in which the text translation apparatus calculates the continuous sampled vector according to the target output probability is described. In the foregoing manner, the discrete target output probability can be continuous, that is, the continuous sampled vector is generated. Because the continuous sampled vector has no gradient and meets data processing rules, a derivative may be taken, and a sampling process may be simulated, thereby improving the feasibility and operability of the solution.

Based on the sixth embodiment corresponding to FIG. 3, in a seventh optional embodiment of the text translation method provided in the embodiments of the present disclosure, the calculating a discrete sampled vector according to the continuous sampled vector may include:

processing the continuous sampled vector by using an argmax function to generate the discrete sampled vector, a value included in the discrete sampled vector being 0 or 1.

In a possible implementation, the discrete sampled vector may be calculated in the following manner:

$$\hat{a}_i^k = \begin{cases} 1 & k = \arg\max_{k'} \bar{a}_i^{k'} \\ 0 & \text{otherwise} \end{cases},$$

where $\hat{a}_i^k$ represents the discrete sampled vector, $\arg\max_{k'}$ represents k' corresponding to a maximum value of $\bar{a}_i^{k'}$, and otherwise represents a case in which $k \neq \arg\max_k \bar{a}_i^{k'}$.

In this embodiment, the text translation apparatus performs discretization processing on the continuous sampled vector by using a straight-through Gumbel-SoftMax (ST Gumbel-SoftMax) function, to output a discretized result $\hat{a} = \hat{a}_i^k, \ldots, \hat{a}_i^K$. In one embodiment, the calculation manner is shown as follows:

$$\hat{a}_i^k = \begin{cases} 1 & k = \arg\max_{k'} \bar{a}_i^{k'} \\ 0 & \text{otherwise} \end{cases},$$

where $\hat{a}_i^{k=1}$ represents a first discrete sampled vector, a case in which k=1 may be represented as "REUSE", that is, a previous refinement result $\hat{h}^i$ is used; and a case in which k=2 may be represented as "REFINE", that is, the source-end encoding is re-refined.

Further, in this embodiment of the present disclosure, a manner in which the text translation apparatus calculates the discrete sampled vector according to the continuous sampled vector is described. In the foregoing manner, on one hand, an implementation basis is provided for calculating the discrete sampled vector, thereby improving the feasibility of the solution. On the other hand, in an actual application, discretization processing needs to be performed on the continuous sampled vector, to facilitate representation of the encoding result, thereby improving the practicality of the solution.

Based on the seventh embodiment corresponding to FIG. 3, in an eighth optional embodiment of the text translation method provided in the embodiments of the present disclosure, the calculating an encoding result according to the discrete sampled vector may include:

calculating the encoding result according to a first discrete sampled vector, a second discrete sampled vector, the second hidden state sequence, and a third hidden state sequence, the first discrete sampled vector being a discrete sampled vector corresponding to the first processing mode, the second discrete sampled vector being a discrete sampled vector corresponding to the second processing mode, the third hidden state sequence being a hidden state sequence generated after second-time encoding.

In a possible implementation, the encoding result may be calculated in the following manner:

$$\tilde{h}^{i+1} = \hat{a}_i^{k=1} \hat{h}^i + \hat{a}_i^{k=2} \hat{h}^{i+1},$$

where $\tilde{h}^{i+1}$ represents the encoding result, $\hat{a}_i^{k=1}$ represents the first discrete sampled vector, the first discrete sampled vector being in correspondence with the first processing mode, $\hat{a}_i^{k=2}$ represents the second discrete sampled vector, the second discrete sampled vector being in correspondence with the second processing mode, $\hat{h}^i$ represents the second hidden state sequence, and $\hat{h}^{i+1}$ represents the third hidden state sequence.

Further, in this embodiment of the present disclosure, a specific manner of calculating the encoding result according to the discrete sampled vector is provided. In the foregoing manner, on one hand, an implementation basis is provided for calculating the encoding result, thereby improving the feasibility of the solution. On the other hand, in an actual application, whether a next word needs to be refined can be more efficiently predicted, thereby improving the practicality of the solution.

Based on the fourth embodiment corresponding to FIG. 3, in a ninth optional embodiment of the text translation method provided in the embodiments of the present disclosure, a training process of a text translation model (encoder-refiner-decoder) may include:

obtaining a prediction target language text and a sample target language text that correspond to a sample source language text, the prediction target language text being obtained through translation by using the text translation model, the sample target language text being used for supervision of the prediction target language text during model training;

calculating a model prediction loss according to the prediction target language text and the sample target language text;

calculating a total model loss according to the model prediction loss and a penalty term, the penalty term being determined according to a second discrete sampled vector and a total quantity of words in the sample source language text, the second discrete sampled vector being a discrete sampled vector corresponding to the second processing mode; and training the text translation model according to the total model loss.

In a possible implementation, the model prediction loss may be calculated in the following manner:

$$L'(\hat{y}, y) = L(\hat{y}, y) + r(\hat{a}),$$

$$r(\hat{a}) = \alpha \left( \sum_{i=1}^{I} \hat{a}_i^{k=2} \right) \bigg/ I,$$

where $L'(\hat{y}, y)$ represents a total model loss function, $L(\hat{y}, y)$ represents a model prediction loss function, $\hat{y}$ represents a predicted value of the model (that is, the prediction target language text), y represents an actual value of the model (that is, the sample target language text), $r(\hat{a})$ represents the penalty term, $\hat{a}_i^{k=2}$ represents the second discrete sampled vector, the second discrete sampled vector being in correspondence with the second processing mode, I represents the total quantity of words in the source language text, and α represents a second hyperparameter.

In this embodiment, when neural network models, especially some linear classifiers, are trained, a loss function usually needs to be defined. Model training is to minimize a function value of the loss function by using a sample. When the function value of the loss function meets a convergence condition, training is stopped. To limit a quantity of re-refinement actions, in the present disclosure, a new function, that is, the penalty term, is added based on the original model prediction loss function.

Based on the model loss function $L(\hat{y}, y)$, the penalty term $r(\hat{a})$ is added to obtain the following total model loss function:

$$L'(\hat{y}, y) = L(\hat{y}, y) + \alpha \left( \sum_{i=1}^{I} \hat{a}_i^{k=2} \right) \bigg/ I.$$

The loss function is minimized by using the foregoing total model loss function.

There are a relatively large quantity of types of loss functions, for example, the loss function may be a cross-entropy loss function. This is not limited herein.

Further, in this embodiment of the present disclosure, a manner of limiting the refinement action is provided. A penalty term is added based on the original loss function. In the foregoing manner, to train a more proper selection policy, the quantity of re-refinement actions may be limited, to encourage the model to reuse a previous result. The foregoing constraint is implemented by adding a penalty term, thereby improving the feasibility and reliability of the solution.

For ease of understanding, the present disclosure may be applied to a neural network model that requires enhancement of local information and modeling of discrete queues. Machine translation is used as an example. In a Chinese-English machine translation task test of the National Institute of Standards and Technology (NIST), the translation quality can be significantly improved by using the solutions provided in the present disclosure. Table 1 shows effects achieved on a machine translation system by using the solutions provided in the present disclosure.

TABLE 1

| Model | Quantity of parameters | MT03 | MT04 | MT05 | MT06 | MT08 | Ave. | Δ |
|---|---|---|---|---|---|---|---|---|
| Reference | 86.69 M | 37.26 | 40.50 | 36.67 | 37.10 | 28.54 | 36.01 | — |
| Shallow understanding | 92.69 M | 38.12 | 41.35 | 38.51 | 37.85 | 29.32 | 37.03 | +1.02 |
| Deep understanding | 110.70 M | 39.23 | 42.72 | 39.90 | 39.24 | 30.68 | 38.35 | +2.34 |
| Conditioning | 112.95 M | 38.61 | 41.99 | 38.89 | 38.04 | 29.36 | 37.38 | +1.37 |

It can be learned that an increase of more than 0.5 points in bilingual evaluation understudy (BLEU) generally indicates a significant improvement. The column named Δ represents absolute values of an increase. The unit of the quantity of parameters is million (M). MT03, MT04, MT05, MT06, and MT08 are machine translation test sets of the NIST.

Figure 5:
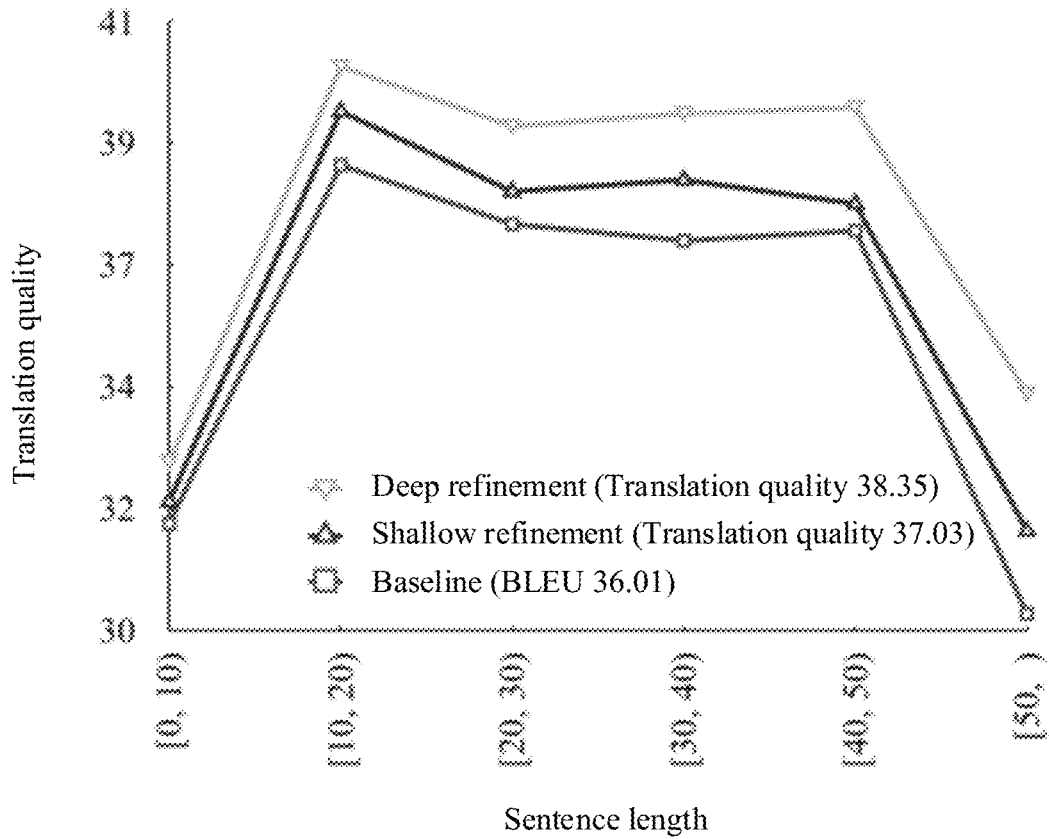
FIG. 5 is a schematic diagram of comparison between translation quality corresponding to different sentence lengths in an application scenario of the present disclosure.

FIG. 5 is a schematic diagram of comparison of translation quality corresponding to different sentence lengths in an application scenario of the present disclosure. As shown in the figure, the baseline represents translation quality of a sequence obtained through training by using a standard neural machine translation (NMT) model, shallow refinement represents translation quality of a sequence obtained after a context vector is added, deep refinement represents translation quality of a sequence generated after the shallow refinement is re-encoded, and conditioning represents a refinement condition. It can be learned that the method provided in the present disclosure performs well in translation of relatively long sentences, and the translation quality obtained after second-time encoding is better.

Figure 6:
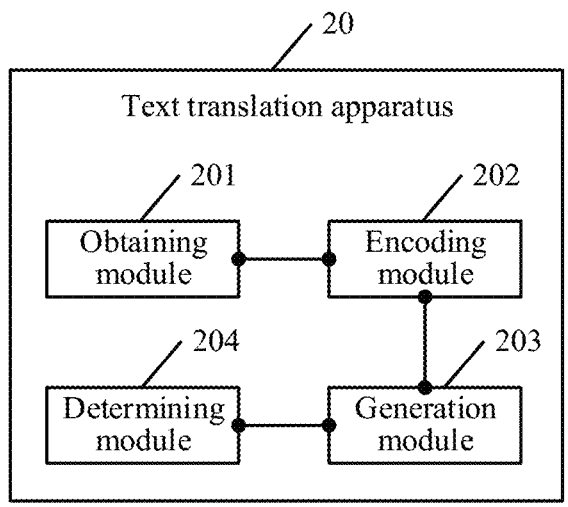
FIG. 6 is a schematic diagram of an embodiment of a text translation apparatus according to an embodiment of the present disclosure.

The text translation apparatus in the present disclosure is described in detail below. FIG. 6 is a schematic diagram of an embodiment of the text translation apparatus according to an embodiment of the present disclosure. The text translation apparatus 20 includes:

an obtaining module 201, configured to obtain a to-be-translated text sequence, the to-be-translated text sequence being generated according to a source language text, the source language text including at least one word;

an encoding module 202, configured to encode the to-be-translated text sequence obtained by the obtaining module 201 to obtain a first hidden state sequence;

the obtaining module 201 being further configured to obtain a first state vector, the first state vector being a state vector corresponding to a predecessor word of a current word, the current word representing a to-be-translated word in the source language text, the predecessor word representing a word that has been translated in the source language text;

a generation module 203, configured to generate a second hidden state sequence according to the first state vector obtained by the obtaining module 201 and the first hidden state sequence;

the generation module 203 being further configured to generate a context vector corresponding to the current word according to the second hidden state sequence and the first state vector; and a determining module 204, configured to determine a second target word according to the context vector generated by the generation module 203, the first state vector, and a first target word, the first target word being a translation result of the predecessor word, the second target word being a translation result of the current word.

In an embodiment, the generation module 203 is configured to: calculate a gating function according to a target hidden state vector and the first state vector, the target hidden state vector being a hidden state vector in the first hidden state sequence;

calculate a target shallow understanding vector according to the gating function and the target hidden state vector;

generate a shallow understanding sequence according to the target shallow understanding vector, the shallow understanding sequence being in correspondence with the first hidden state sequence; and encode the shallow understanding sequence to obtain the second hidden state sequence.

In an embodiment, the generation module 203 is configured to:

calculate the gating function according to the target hidden state vector, the first state vector, and a sigmoid function; and perform element-wise multiplication on the target hidden state vector and the gating function to obtain the target shallow understanding vector.

Figure 7:
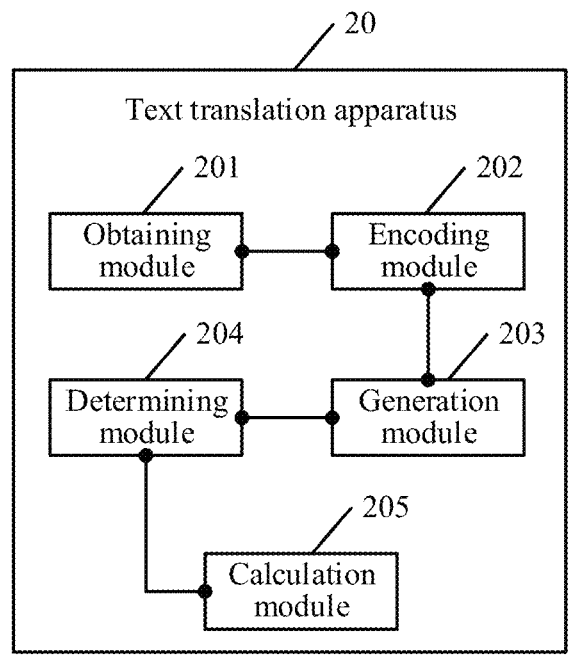
FIG. 7 is a schematic diagram of another embodiment of a text translation apparatus according to an embodiment of the present disclosure.

In an embodiment, based on the text translation apparatus shown in FIG. 6, as shown in FIG. 7, the apparatus further includes:

a calculation module 205, configured to calculate a target output probability according to the context vector, a second state vector, and a word vector corresponding to the second target word, the second state vector being a state vector corresponding to the current word;

the calculation module 205 being further configured to calculate a continuous sampled vector according to the target output probability, the continuous sampled vector being used for generating a continuous sampled sequence;

the calculation module 205 being further configured to calculate a discrete sampled vector according to the continuous sampled vector, the discrete sampled vector being used for generating a discrete sampled sequence;

the calculation module 205 being further configured to calculate an encoding result according to the discrete sampled vector; and the determining module 204 being configured to determine a processing mode according to the encoding result, the processing mode including a first processing mode and a second processing mode, the first processing mode indicating that an existing encoding result is used, the second processing mode indicating that the first hidden state sequence is encoded.

In an embodiment, the calculation module 205 is further configured to:

determine a state of a policy function by using a hyperbolic tangent function according to the context vector, the second state vector, and the word vector corresponding to the second target word; and calculate the target output probability by using a normalized exponential function according to the state of the policy function.

In an embodiment, the calculation module 205 is further configured to:

sample the target output probability by using a preset sampling function to obtain a sampled parameter, the preset sampling function being a Gumbel-SoftMax function, the sampled parameter being discrete; and perform continuation processing on the sampled parameter to obtain the continuous sampled vector.

In an embodiment, the calculation module 205 is further configured to:

process the continuous sampled vector by using an argmax function to generate the discrete sampled vector, a value included in the discrete sampled vector being 0 or 1.

In an embodiment, the calculation module 205 is further configured to:

calculate the encoding result according to a first discrete sampled vector, a second discrete sampled vector, the second hidden state sequence, and a third hidden state sequence, the first discrete sampled vector being a discrete sampled vector corresponding to the first processing mode, the second discrete sampled vector being a discrete sampled vector corresponding to the second processing mode, the third hidden state sequence being a hidden state sequence generated after second-time encoding.

In an embodiment, the apparatus further includes a training module. The training module is configured to:

obtain a prediction target language text and a sample target language text that correspond to a sample source language text, the prediction target language text being obtained through translation by using a text translation model, the sample target language text being used for supervision of the prediction target language text during model training;

calculate a model prediction loss according to the prediction target language text and the sample target language text;

calculate a total model loss according to the model prediction loss and a penalty term, the penalty term being determined according to a second discrete sampled vector and a total quantity of words in the sample source language text, the second discrete sampled vector being a discrete sampled vector corresponding to the second processing mode; and train the text translation model according to the total model loss.

Reference may be made to the method embodiments for function implementations of the functional modules in the text translation apparatus, and details are not described herein again in this embodiment.

Each module/unit and/or submodule/subunit in various disclosed embodiments can be integrated in a processing unit, or each module/unit and/or submodule/subunit can exist separately and physically, or two or more modules/units and/or submodule/subunit can be integrated in one unit. The modules/units and/or submodule/subunit as disclosed herein can be implemented in the form of hardware (e.g., processing circuitry and/or memory) or in the form of software functional unit(s) (e.g., developed using one or more computer programming languages), or a combination of hardware and software.

Figure 8:
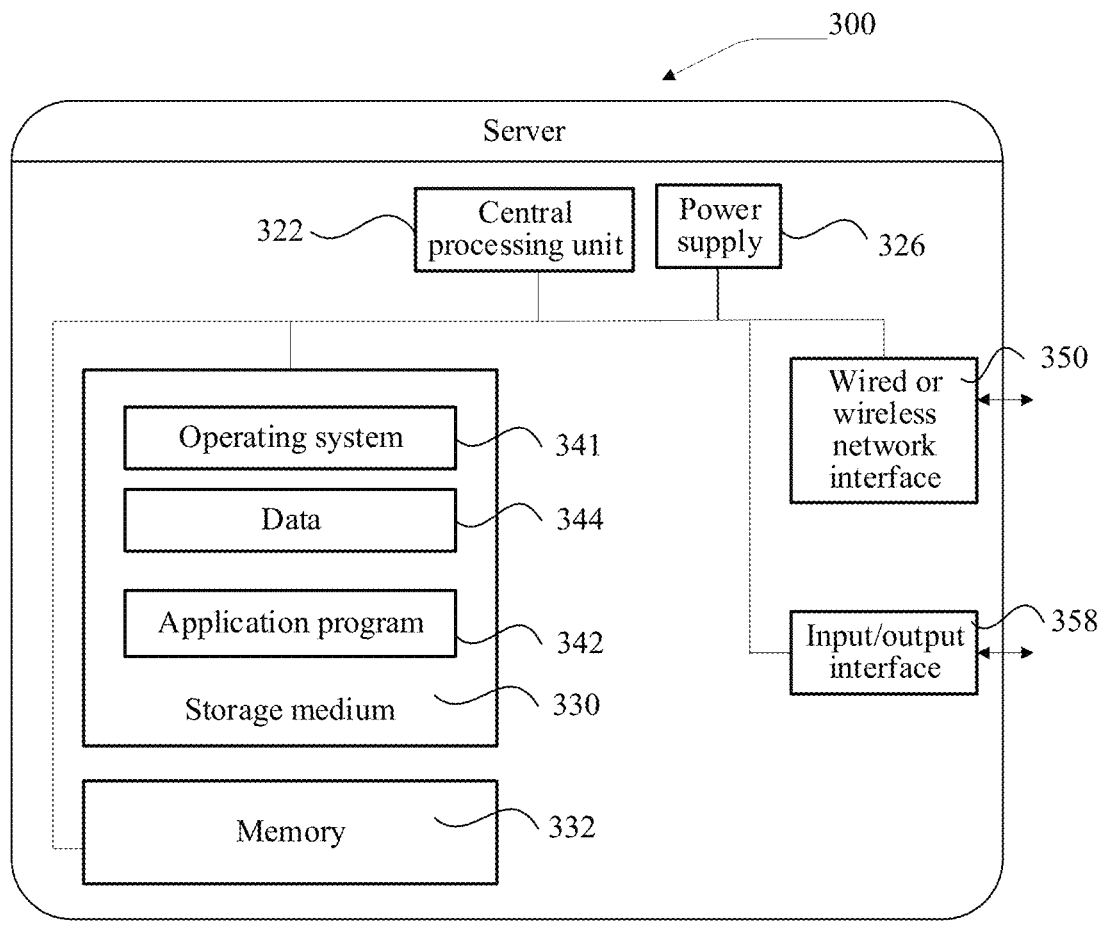
FIG. 8 is a schematic structural diagram of a text translation apparatus according to an embodiment of the present disclosure.

FIG. 8 is a schematic structural diagram of a server according to an embodiment of the present disclosure. The server 300 may vary greatly due to different configurations or performance, and may include one or more central processing units (CPUs) 322 (for example, one or more processors), a memory 332, and one or more storage media 330 (for example, one or more mass storage devices) that store an application program 342 or data 344. The memory 332 and the storage medium 330 may be transient or persistent storage. The program stored in the storage medium 330 may include one or more modules (not shown in the figure), and each module may include a series of instruction operations for the server. Further, the CPU 322 may be configured to communicate with the storage medium 330, and execute, on the server 300, the series of instruction operations in the storage medium 330.

The server 300 may further include one or more power supplies 326, one or more wired or wireless network interfaces 350, one or more input/output interfaces 358, and/or one or more operating systems 341 such as Windows Server™, Mac OS X™, Unix™, Linux™, or FreeBSD™.

The steps performed by the server in the foregoing embodiments may be based on the server structure shown in FIG. 8.

In this embodiment of the present disclosure, the CPU 322 included in the server is configured to implement the text translation method in the foregoing method embodiments.

Figure 9:
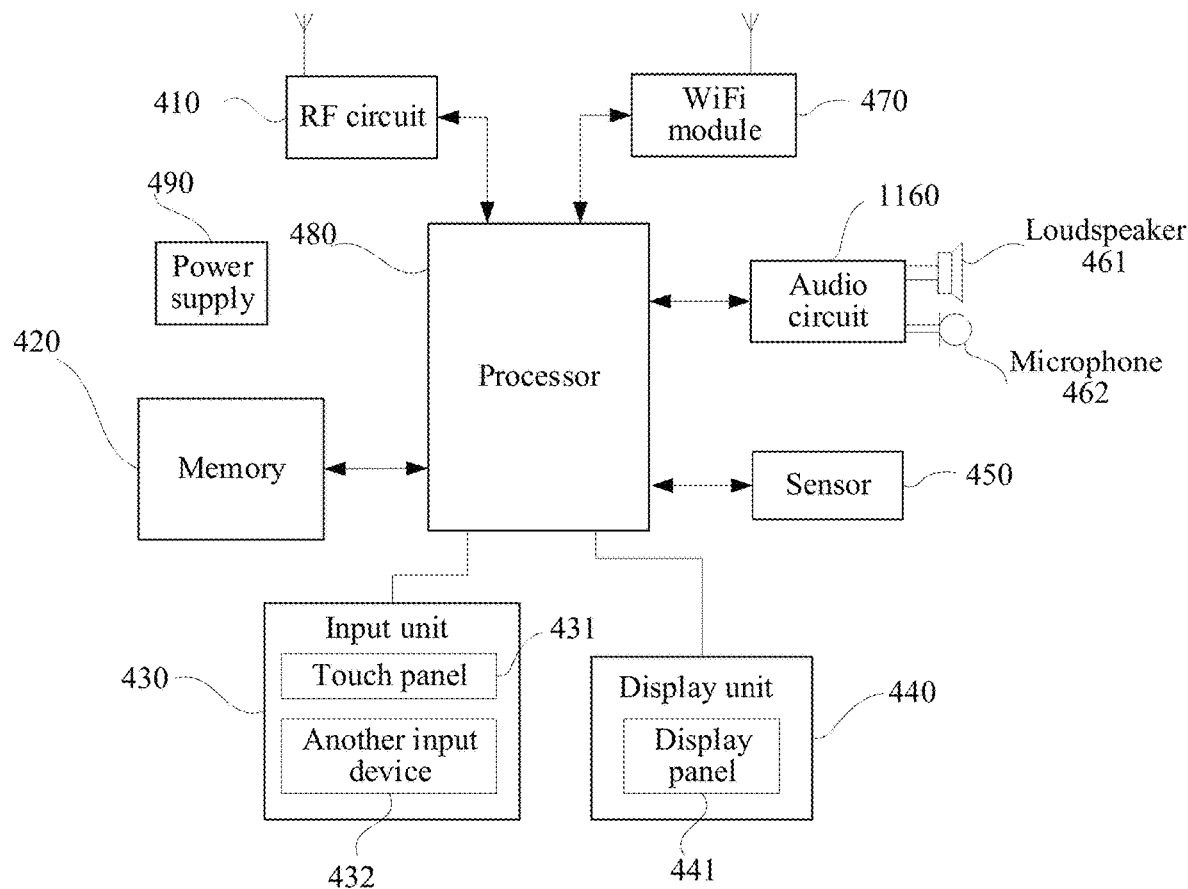
FIG. 9 is another schematic structural diagram of a text translation apparatus according to an embodiment of the present disclosure.

An embodiment of the present disclosure further provides another text translation apparatus, as shown in FIG. 9. For ease of description, only a part related to this embodiment of the present disclosure is shown. For specific technical details not disclosed, refer to the method part of the embodiments of the present disclosure. The terminal device may be any terminal device including a mobile phone, a tablet computer, a personal digital assistant (PDA), a point of sales (POS), and an on-board computer, and the terminal device being a mobile phone is used as an example.

FIG. 9 is a block diagram of a partial structure of the mobile phone related to the terminal device according to this embodiment of the present disclosure. Referring to FIG. 9, the mobile phone includes components such as a radio frequency (RF) circuit 410, a memory 420, an input unit 430, a display unit 440, a sensor 450, an audio circuit 460, a wireless fidelity (WiFi) module 470, a processor 480, and a power supply 490. A person skilled in the art may understand that the structure of the mobile phone shown in FIG. 9 does not constitute a limitation on the mobile phone, and the mobile phone may include more or fewer components than those shown in the figure, or some components may be combined, or a different component deployment may be used.

The following describes the components of the mobile phone with reference to FIG. 9.

The RF circuit 410 may be configured to receive and send signals during an information receiving and sending process or a call process. Specifically, the RF circuit 410 receives downlink information from a base station, then delivers the downlink information to the processor 480 for processing, and sends designed uplink data to the base station. Usually, the RF circuit 410 includes, but is not limited to, an antenna, at least one amplifier, a transceiver, a coupler, a low noise amplifier (LNA), and a duplexer. In addition, the RF circuit 410 may also communicate with a network and another device through wireless communication. The wireless communication may use any communication standard or protocol, including but not limited to Global System for Mobile Communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 420 may be configured to store a software program and module. The processor 480 runs the software program and module stored in the memory 420, to implement various functional applications and data processing of the mobile phone. The memory 420 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 420 may include a high-speed random-access memory, and may further include a non-volatile memory, such as at least one magnetic disk storage device, a flash memory, or another volatile solid-state storage device.

The input unit 430 may be configured to receive input digit or character information, and generate a keyboard signal input related to the user setting and function control of the mobile phone. Specifically, the input unit 430 may include a touch panel 431 and another input device 432. The touch panel 431, which may also be referred to as a touch screen, may collect a touch operation of a user on or near the touch panel (such as an operation of a user on or near the touch panel 431 by using any suitable object or accessory such as a finger or a stylus), and drive a corresponding connection apparatus according to a preset program. In one embodiment, the touch panel 431 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 480. Moreover, the touch controller can receive and execute a command sent from the processor 480. In addition, the touch panel 431 may be implemented by using various types, such as a resistive type, a capacitive type, an infrared type, and a surface acoustic wave type. In addition to the touch panel 431, the input unit 430 may further include the another input device 432. Specifically, the another input device 432 may include, but is not limited to, one or more of a physical keyboard, a functional key (such as a volume control key or a switch key), a track ball, a mouse, and a joystick.

The display unit 440 may be configured to display information inputted by the user or information provided for the user, and various menus of the mobile phone. The display unit 440 may include a display panel 441. In one embodiment, the display panel 441 may be configured by using a liquid crystal display (LCD), an organic light-emitting diode (OLED), or the like. Further, the touch panel 431 may cover the display panel 441. After detecting a touch operation on or near the touch panel 431, the touch panel 431 transfers the touch operation to the processor 480, to determine a type of a touch event. Then, the processor 480 provides a corresponding visual output on the display panel 441 according to the type of the touch event. Although in FIG. 9, the touch panel 431 and the display panel 441 are used as two separate parts to implement input and output functions of the mobile phone, in some embodiments, the touch panel 431 and the display panel 441 may be integrated to implement the input and output functions of the mobile phone.

The mobile phone may further include at least one sensor 450 such as an optical sensor, a motion sensor, and other sensors. Specifically, the optical sensor may include an ambient light sensor and a proximity sensor. The ambient light sensor may adjust luminance of the display panel 441 according to brightness of the ambient light. The proximity sensor may switch off the display panel 441 and/or backlight when the mobile phone is moved to the ear. As one type of motion sensor, an acceleration sensor can detect magnitude of accelerations in various directions (generally on three axes), may detect magnitude and a direction of the gravity when being static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 460, a loudspeaker 461, and a microphone 462 may provide audio interfaces between a user and the mobile phone. The audio circuit 460 may convert received audio data into an electrical signal and transmit the electrical signal to the loudspeaker 461. The loudspeaker 461 converts the electrical signal into a sound signal for output. On the other hand, the microphone 462 converts a collected sound signal into an electrical signal. The audio circuit 460 receives the electrical signal, converts the electrical signal into audio data, and outputs the audio data to the processor 480 for processing. Then, the processor 1080 sends the audio data to, for example, another mobile phone by using the RF circuit 410, or outputs the audio data to the memory 420 for further processing.

WiFi is a short distance wireless transmission technology. The mobile phone may help, by using the WiFi module 470, a user to receive and send an e-mail, browse a web page, access streaming media, and on the like, which provides wireless broadband Internet access for the user. Although FIG. 9 shows the WiFi module 470, it may be understood that the WiFi module is not a necessary component of the mobile phone, and the WiFi module may be omitted as required provided that the scope of the essence of the present disclosure is not changed.

The processor 480 is a control center of the mobile phone, and is connected to various parts of the entire mobile phone by using various interfaces and lines. By running or executing a software program and/or module stored in the memory 420, and invoking data stored in the memory 420, the processor 480 executes various functions of the mobile phone and performs data processing, thereby monitoring the entire mobile phone. In one embodiment, the processor 480 may include one or more processing units. In one embodiment, the processor 480 may integrate an application processor and a modem processor. The application processor mainly processes an operating system, a user interface, an application program, and the like. The modem processor mainly processes wireless communication. It may be understood that the foregoing modem processor may alternatively not be integrated into the processor 480.

The mobile phone further includes the power supply 490 (such as a battery) for supplying power to the components. In one embodiment, the power supply may be logically connected to the processor 480 by using a power management system, thereby implementing functions such as charging, discharging, and power consumption management by using the power management system.

Although not shown in the figure, the mobile phone may further include a camera, a Bluetooth module, and the like, and details are not further described herein.

In this embodiment of the present disclosure, the processor 480 included in the terminal device is configured to implement the text translation method in the foregoing method embodiments.

A person skilled in the art may clearly understand that, for convenience and conciseness of description, for detailed working processes of the foregoing system, apparatus, and unit, reference may be made to corresponding processes in the foregoing method embodiments, and details are not described herein again.

In the several embodiments provided in the present disclosure, it is to be understood that the disclosed system, apparatus, and method may be implemented in other manners. For example, the described apparatus embodiments are merely exemplary. For example, the unit division is merely logical function division and there may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, that is, may be located in one place or may be distributed over a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or some of the technical solutions may be implemented in the form of a software product. The computer software product is stored in a storage medium, and includes several instructions for enabling a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random-access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art is to understand that modifications can be made to the technical solutions described in the foregoing embodiments, or equivalent replacements can be made to some technical features in the technical solutions without departing from the spirit and scope of the technical solutions of the embodiments of the present disclosure.

What is claimed is:

1. A text translation method applied to a computing device, comprising:
   obtaining a to-be-translated text sequence, the to-be-translated text sequence being generated according to a source language text, the source language text comprising at least one word;
   encoding the to-be-translated text sequence to obtain a first hidden state sequence;
   obtaining a first state vector, the first state vector being a state vector corresponding to a predecessor word of a current word, the current word being a to-be-translated word in the source language text, the predecessor word being a word that has been translated in the source language text;
   generating a second hidden state sequence according to the first state vector and the first hidden state sequence;
   generating a context vector corresponding to the current word according to the second hidden state sequence and the first state vector, the context vector being only generated based on information in the source language text; and
   determining a second target word according to the context vector, the first state vector, and a first target word, the first target word being a translation result of the predecessor word, the second target word being a translation result of the current word,
   wherein after determining the second target word according to the context vector, the first state vector, and the first target word, the method further comprises:
      calculating a target output probability according to the context vector, a second state vector, and a word vector corresponding to the second target word, the second state vector being a state vector corresponding to the current word;
      calculating a continuous sampled vector according to the target output probability, the continuous sampled vector being used for generating a continuous sampled sequence;
      calculating a discrete sampled vector according to the continuous sampled vector, the discrete sampled vector being used for generating a discrete sampled sequence;
      calculating an encoding result according to the discrete sampled vector; and
      determining a processing mode according to the encoding result, the processing mode comprising a first processing mode and a second processing mode, the first processing mode indicating that an existing encoding result is used, the second processing mode including encoding the first hidden state sequence; and
   wherein the method further comprises:
      obtaining a prediction target language text and a sample target language text that correspond to a sample source language text, the prediction target language text being obtained through translation by using a text translation model, the sample target language text being used for supervision of the prediction target language text during model training;
      calculating a model prediction loss according to the prediction target language text and the sample target language text;
      calculating a total model loss according to the model prediction loss and a penalty term, the penalty term being determined according to a second discrete sampled vector and a total quantity of words in the sample source language text, the second discrete sampled vector being a discrete sampled vector corresponding to the second processing mode; and training the text translation model according to the total model loss.

2. The method according to claim 1, wherein the generating a second hidden state sequence according to the first state vector and the first hidden state sequence comprises:

calculating a gating function according to a target hidden state vector and the first state vector, the target hidden state vector being a hidden state vector in the first hidden state sequence;

calculating a target shallow understanding vector according to the gating function and the target hidden state vector;

generating a shallow understanding sequence according to the target shallow understanding vector, the shallow understanding sequence corresponding to the first hidden state sequence; and encoding the shallow understanding sequence to obtain the second hidden state sequence.

3. The method according to claim 2, wherein the calculating a gating function according to a target hidden state vector and the first state vector comprises:

calculating the gating function according to the target hidden state vector, the first state vector, and a sigmoid function; and the calculating a target shallow understanding vector according to the gating function and the target hidden state vector comprises:

performing element-wise multiplication on the target hidden state vector and the gating function to obtain the target shallow understanding vector.

4. The method according to claim 1, wherein the calculating a target output probability according to the context vector, a second state vector, and a word vector corresponding to the second target word comprises:

determining a state of a policy function by using a hyperbolic tangent function according to the context vector, the second state vector, and the word vector corresponding to the second target word; and calculating the target output probability by using a normalized exponential function according to the state of the policy function.

5. The method according to claim 4, wherein the calculating a continuous sampled vector according to the target output probability comprises:

sampling the target output probability by using a preset sampling function to obtain a sampled parameter, the preset sampling function being a Gumbel-SoftMax function, the sampled parameter being discrete; and performing continuation processing on the sampled parameter to obtain the continuous sampled vector.

6. The method according to claim 5, wherein the calculating a discrete sampled vector according to the continuous sampled vector comprises:

processing the continuous sampled vector by using an argmax function to generate the discrete sampled vector, a value comprised in the discrete sampled vector being 0 or 1.

7. The method according to claim 6, wherein the calculating an encoding result according to the discrete sampled vector comprises:

calculating the encoding result according to a first discrete sampled vector, the second discrete sampled vector, the second hidden state sequence, and a third hidden state sequence, the first discrete sampled vector being a discrete sampled vector corresponding to the first processing mode, the third hidden state sequence being a hidden state sequence generated after second-time encoding.

8. A text translation apparatus, comprising:

a memory, and a processor, the memory being configured to store a program; and the processor being configured to execute the program in the memory, and perform a plurality of operations comprising:

obtaining a to-be-translated text sequence, the to-be-translated text sequence being generated according to a source language text, the source language text comprising at least one word;

encoding the to-be-translated text sequence to obtain a first hidden state sequence;

obtaining a first state vector, the first state vector being a state vector corresponding to a predecessor word of a current word, the current word being a to-be-translated word in the source language text, the predecessor word being a word that has been translated in the source language text;

generating a second hidden state sequence according to the first state vector and the first hidden state sequence;

generating a context vector corresponding to the current word according to the second hidden state sequence and the first state vector, the context vector being only generated based on information in the source language text; and determining a second target word according to the context vector, the first state vector, and a first target word, the first target word being a translation result of the predecessor word, the second target word being a translation result of the current word;

wherein after determining the second target word according to the context vector, the first state vector, and the first target word, the method further comprises:

calculating a target output probability according to the context vector, a second state vector, and a word vector corresponding to the second target word, the second state vector being a state vector corresponding to the current word;

calculating a continuous sampled vector according to the target output probability, the continuous sampled vector being used for generating a continuous sampled sequence;

calculating a discrete sampled vector according to the continuous sampled vector, the discrete sampled vector being used for generating a discrete sampled sequence;

calculating an encoding result according to the discrete sampled vector; and determining a processing mode according to the encoding result, the processing mode comprising a first processing mode and a second processing mode, the first processing mode indicating that an existing encoding result is used, the second processing mode including encoding the first hidden state sequence; and wherein the method further comprises:

obtaining a prediction target language text and a sample target language text that correspond to a sample source language text, the prediction target language text being obtained through translation by using a text translation model, the sample target language text being used for supervision of the prediction target language text during model training;

calculating a model prediction loss according to the prediction target language text and the sample target language text calculating a total model loss according to the model prediction loss and a penalty term, the penalty term being determined according to a second discrete sampled vector and a total quantity of words in the sample source language text, the second discrete sampled vector being a discrete sampled vector corresponding to the second processing mode; and training the text translation model according to the total model loss.

9. The text translation apparatus according to claim 8, wherein the processor is further configured to perform a plurality of operations comprising:

calculating a gating function according to a target hidden state vector and the first state vector, the target hidden state vector being a hidden state vector in the first hidden state sequence;

calculating a target shallow understanding vector according to the gating function and the target hidden state vector;

generating a shallow understanding sequence according to the target shallow understanding vector, the shallow understanding sequence corresponding to the first hidden state sequence; and encoding the shallow understanding sequence to obtain the second hidden state sequence.

10. The text translation apparatus according to claim 9, wherein the processor is further configured to perform a plurality of operations comprising:

calculating the gating function according to the target hidden state vector, the first state vector, and a sigmoid function; and performing element-wise multiplication on the target hidden state vector and the gating function to obtain the target shallow understanding vector.

11. The text translation apparatus according to claim 8, wherein the processor is further configured to perform a plurality of operations comprising:

determining a state of a policy function by using a hyperbolic tangent function according to the context vector, the second state vector, and the word vector corresponding to the second target word; and calculating the target output probability by using a normalized exponential function according to the state of the policy function.

12. The text translation apparatus according to claim 11, wherein the processor is further configured to perform a plurality of operations comprising:

sampling the target output probability by using a preset sampling function to obtain a sampled parameter, the preset sampling function being a Gumbel-SoftMax function, the sampled parameter being discrete; and performing continuation processing on the sampled parameter to obtain the continuous sampled vector.

13. The text translation apparatus according to claim 12, wherein the processor is further configured to perform a plurality of operations comprising:

processing the continuous sampled vector by using an argmax function to generate the discrete sampled vector, a value comprised in the discrete sampled vector being 0 or 1.

14. The text translation apparatus according to claim 13, wherein the processor is further configured to perform a plurality of operations comprising:

calculating the encoding result according to a first discrete sampled vector, the second discrete sampled vector, the second hidden state sequence, and a third hidden state sequence, the first discrete sampled vector being a discrete sampled vector corresponding to the first processing mode, the third hidden state sequence being a hidden state sequence generated after second-time encoding.

15. A non-transitory computer-readable storage medium, storing instructions, the instructions, when run on a computer, causing the computer to perform a plurality of operations comprising:

obtaining a to-be-translated text sequence, the to-be-translated text sequence being generated according to a source language text, the source language text comprising at least one word;

encoding the to-be-translated text sequence to obtain a first hidden state sequence;

obtaining a first state vector, the first state vector being a state vector corresponding to a predecessor word of a current word, the current word being a to-be-translated word in the source language text, the predecessor word being a word that has been translated in the source language text;

generating a second hidden state sequence according to the first state vector and the first hidden state sequence;

generating a context vector corresponding to the current word according to the second hidden state sequence and the first state vector, the context vector being generated only based on information in the source language text; and determining a second target word according to the context vector, the first state vector, and a first target word, the first target word being a translation result of the predecessor word, the second target word being a translation result of the current word;

wherein after determining the second target word according to the context vector, the first state vector, and the first target word, the method further comprises:

calculating a target output probability according to the context vector, a second state vector, and a word vector corresponding to the second target word, the second state vector being a state vector corresponding to the current word;

calculating a continuous sampled vector according to the target output probability, the continuous sampled vector being used for generating a continuous sampled sequence;

calculating a discrete sampled vector according to the continuous sampled vector, the discrete sampled vector being used for generating a discrete sampled sequence;

calculating an encoding result according to the discrete sampled vector; and determining a processing mode according to the encoding result, the processing mode comprising a first processing mode and a second processing mode, the first processing mode indicating that an existing encoding result is used, the second processing mode including encoding the first hidden state sequence; and wherein the method further comprises:

obtaining a prediction target language text and a sample target language text that correspond to a sample source language text, the prediction target language text being obtained through translation by using a text translation model, the sample target language text being used for supervision of the prediction target language text during model training;

calculating a model prediction loss according to the prediction target language text and the sample target language text;

calculating a total model loss according to the model prediction loss and a penalty term, the penalty term being determined according to a second discrete sampled vector and a total quantity of words in the sample source language text, the second discrete sampled vector being a discrete sampled vector corresponding to the second processing mode; and training the text translation model according to the total model loss.

16. The storage medium according to claim 15, wherein the generating a second hidden state sequence according to the first state vector and the first hidden state sequence comprises:

calculating a gating function according to a target hidden state vector and the first state vector, the target hidden state vector being a hidden state vector in the first hidden state sequence;

calculating a target shallow understanding vector according to the gating function and the target hidden state vector;

generating a shallow understanding sequence according to the target shallow understanding vector, the shallow understanding sequence corresponding to the first hidden state sequence; and encoding the shallow understanding sequence to obtain the second hidden state sequence.

* * * * *